(12) United States Patent
Richmond (10) Patent No.: US 8,104,914 B2
(45) Date of Patent: *Jan. 31, 2012

(54) LIGHT DEVICE (76) Inventor: Simon N. Richmond, Princeton, NJ (US)

( * ) Notice: Subject to any disclaimer, the term of this patent is extended or adjusted under 35 U.S.C. 154(b) by 423 days.

This patent is subject to a terminal disclaimer.

(21) Appl. No.: 12/236,340

(22) Filed: Sep. 23, 2008

(65) Prior Publication Data
US 2009/0078604 A1 Mar. 26, 2009

Related U.S. Application Data (63) Continuation-in-part of application No. 11/555,175, filed on Oct. 31, 2006, now Pat. No. 7,967,465, which is a continuation-in-part of application No. 11/279,729, filed on Apr. 13, 2006, now Pat. No. 7,377,667, which is a continuation-in-part of application No. 11/057,077, filed on Feb. 11, 2005, now abandoned, and a continuation of application No. 11/107,940, filed on Apr. 15, 2005, now abandoned.

(30) Foreign Application Priority Data

Feb. 13, 2004 (AU) ................................ 2004900700
Nov. 25, 2004 (AU) ................................ 2004906746

(51) Int. Cl.
*F21L 4/00* (2006.01)
(52) U.S. Cl. ......... 362/183; 362/154; 362/253; 362/394
(58) Field of Classification Search .................. 362/183, 362/154, 253, 276, 352, 802, 394; 136/258, 136/291, 293; 307/112; 320/101; 340/815.4, 340/815.46

See application file for complete search history.

(56) References Cited

U.S. PATENT DOCUMENTS 6,254,247 B1 * 7/2001 Carson .......................... 362/101

* cited by examiner

*Primary Examiner* — Thomas Sember
(74) *Attorney, Agent, or Firm* — Volpe and Koenig, P.C.

(57) ABSTRACT

A light device and packaging assembly having packaging containing a product. The product may be a solar powered light device. The packaging includes a switch that is operable to activate the product while the product is still within the packaging so that a user may observe operation of the product without removing the product from the packaging.

45 Claims, 7 Drawing Sheets

LIGHT DEVICE

CROSS-REFERENCE TO RELATED APPLICATION(S)

This application is a continuation in part of application Ser. No. 11/555,175 filed on Oct. 31, 2006 now U.S. Pat. No. 7,967,465, which is a continuation in part of application Ser. No. 11/279,729 filed on Apr. 13, 2006 now U.S. Pat. No. 7,377,667, which is a continuation in part of application Ser. No. 11/057,077 filed on Feb. 11, 2005 now abandoned, which claims priority from foreign application Australia Serial Number 2004900700 filed on Feb. 13, 2004, which are all incorporated herein by reference, and is a continuation of application Ser. No. 11/107,940 filed on Apr. 15, 2005 now abandoned, which claims priority from foreign application Australia Serial Number 2004906746 filed on Nov. 25, 2004, which are all incorporated herein by reference.

TECHNICAL FIELD

The present invention relates to packaging to contain electrically operated apparatus that can be activated while in the packaging.

BACKGROUND OF THE INVENTION

It is not uncommon, particularly in the marketing of toys, for an electrically operated toy to be operated while still in the packaging in order to attract purchases.

In respect of the above packaging access is provided to the controls of the toy so that a user may manipulate the controls to activate the toy.

Described in U.S. Pat. No. 6,020,823 is a device that can be attached to products to be sold. The device produces a light and/or sound upon being activated.

It is also known to package "Christmas lights" in a box containing a battery pack and a switch with the switch being provided to enable a user to activate the lights so the operation may be observed. When the lights are to be used, that is removed from the packaging, the battery pack is disconnected and the lights attached directly connected to a power source such as a transformer taking power from a mains power supply.

OBJECT OF THE INVENTION

It is the object of the present invention to provide a packaging that is usable to activate a product contained in the packaging.

SUMMARY OF THE INVENTION

There is disclosed herein, in combination a packaging and an electrically operated product located in the packaging, said product having an electric circuit to electrically operate a part of the product, the circuit including a power supply to energize the circuit, said packaging including:
 a body housing said product;
 a switch attached to the body and positioned to enable a user to operate the switch;
 an electric connector electrically attached to the switch and removably attached to the circuit, and wherein
 said switch is operated by a user to cause said circuit to be energized and therefore said part to be operated, with said power supply powering said circuit by operation of said switch, with operative detachment of said connector with respect to said circuit also providing for powering of said circuit by said power supply, and thereof operation of said circuit.

Preferably, the body of said packaging includes a wall, and said switch is fixed to said wall.

Preferably, said connector includes two conducting members attached to said switch, with the switch including a user engaged member that is moved to a position electrically connecting the two members and therefore causes operation of the circuit, and is urged to a position not connecting said members.

Preferably, said connector includes a flexible strip including longitudinally extending conductive strip portions between which there is located an insulating strip portion, with the conductive strip portions being attached to the switch so that operation of the switch electrically connects the two conductive portions with detachment of the strip with respect to said circuit providing for the operation detachment of the connector with respect to said circuit.

Preferably, said connector is elongated to enable removal of the product from the packaging without disconnection from the switch.

Preferably, said connector disables the circuit when attached thereto until said switch is operated.

Preferably, said power source is at least one battery.

Preferably, said product includes a battery compartment containing said battery, and said connector is an insulator in respect of said battery and said part, and extends into said compartment, and is slidably removable therefrom to provide for connection of said battery electrically to said part.

Preferably, the power supply is a battery having a positive terminal and a negative terminal, and said circuit further includes a positive terminal to be operatively associated with the positive terminal of the battery and a negative terminal to be operatively associated with the negative terminal of the battery, and said connector is an insulator in respect of said battery by being located between the two positive terminals and/or the two negative terminals so as to electrically isolate the battery, the insulator being removable from between the terminals so that the battery can electrically energize the circuit.

Preferably, the product includes a battery compartment containing the battery, with the connector passing through an aperture in the compartment.

Preferably, said product is a solar powered light device to produce light of varying colour, said device including:
 a product body;
 a lens mounted on the product body and generally enclosing a chamber having an upper rim surrounding a top opening, and a bottom region;
 a reflector mounted in the bottom region;
 a cap assembly including securing means to releasably engage the rim so that the cap assembly can be selectively removed from the lens; said assembly including:
 a base;
 said circuit, with the circuit having at least two lamps of different colours to produce a desired colour including a varying colour, the lamps being mounted to direct light into said chamber, and a solar cell mounted on an exposed surface of the assembly and operatively associated with battery to charge the battery, and a device switch operated to control delivery of electric power from the battery to operate said circuit, the device switch being exposed to provide for access thereto by a user, and wherein
 the packaging switch is connected in parallel with said device switch.

Preferably, said circuit includes a light sensitive switch that renders the circuit operative at low light levels, the light sensitive switch being shielded from light.

Preferably, said device switch is on an exposed downwardly facing surface of said device.

Preferably, said circuit includes three lamps, each of a different colour.

Preferably, said lens is a first lens, and said device includes a second lens, said second lens being attached to said base and providing a cavity into which the LEDs direct light, with the light leaving said second lens then passing through said first lens.

Preferably, the first and second lenses diffuse light.

Preferably, said second lens is detachably secured to said post.

Preferably, said circuit includes a light sub-circuit connected to the lamps to deliver electric power thereto so that the lamps produce said desired colour, with said device switch delivers electric power from the batteries to said sub-circuit.

Preferably, said device switch is a first switch, and said sub-circuit includes an integrated circuit and a second switch connected to said integrated circuit, the second switch being operable to select a desired fixed colour and exposed to provide for access thereto by a user, and the first switch is the on/off switch.

Preferably, said second switch is on said exposed external surface.

Preferably, said product is a solar powered light includes:
a product body;
a lens mounted on the product body and generally enclosing a chamber;
said circuit, the circuit having at least two lamps of different colours to produce a desired colour including a varying colour, the lamps being mounted to direct light into said chamber, and a solar cell mounted on an exposed surface of the assembly and operatively associated with the battery to charge the battery, and a device switch operable to control delivery of electric power from the battery to operate said circuit, the device switch being an on/off switch and exposed to provide for access thereto by a user, with the device switch being in parallel to the packaging switch.

Preferably, said circuit includes a light sensitive switch that renders the circuit operative at low light levels, the light sensitive switch being shield from light.

Preferably, said circuit includes a light sub-circuit connected to the lamps to deliver electric power thereto so that the lamps produce said desired colour, with said device switch being an on/off switch to deliver electric power from the batteries to said sub-circuit.

Preferably, said circuit includes a light sub-circuit having an integrated circuit operable to select a desired fixed colour, with the device including a further switch said further switch being connected to said integrated circuit and operable to select said desired fixed colour.

Preferably, the solar cell is shielded from light.

Preferably, said product is a solar powered light including a battery and a solar cell operative associated with the battery to charge the battery.

Preferably, the solar powered light includes a light sensitive switch that renders the light operative at low light levels, and wherein the light sensitive switch is shielded from light when in said packaging.

Preferably, said product is a solar powered light including a battery and a solar cell operative associated with the battery to charge the battery, and a light sensitive switch that renders the light operative at low light levels, and wherein the light sensitive switch is shielded from light when in said packaging.

Preferably, the switch includes a button that is pressed to activate the circuit, with said button being recessed relative to said wall.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
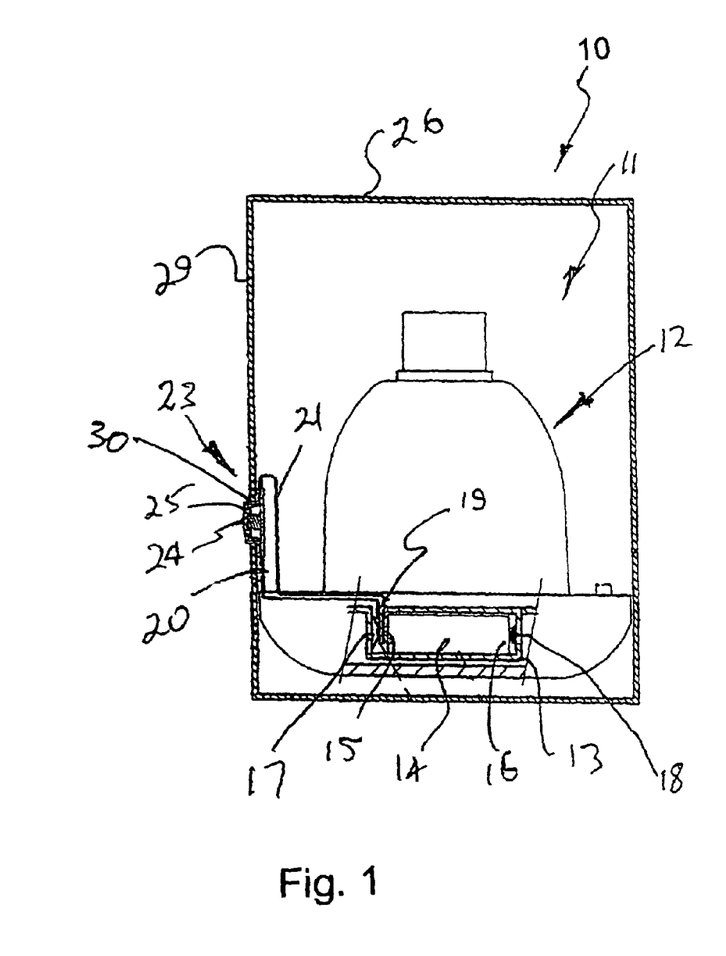
FIG. 1 is a schematic sectioned side elevation of a packaging containing a solar powered light.
Figure 2:
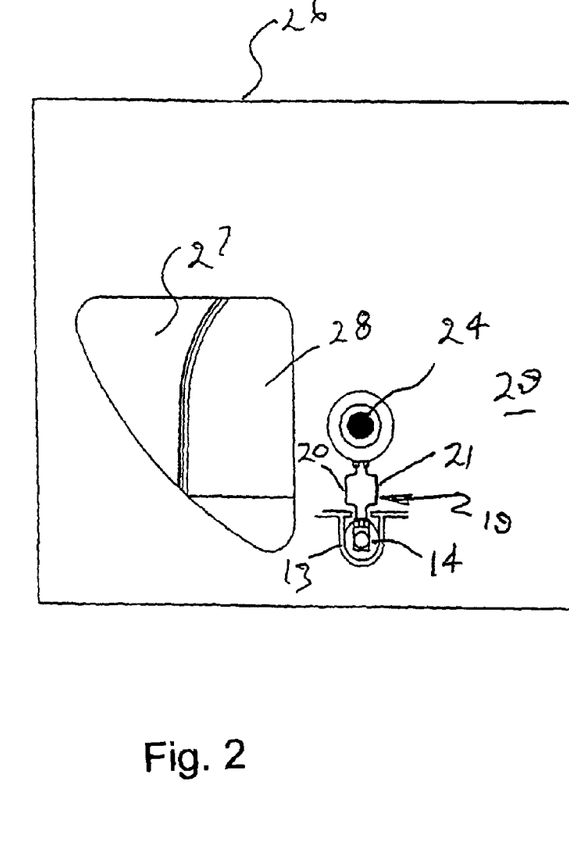
FIG. 2 is a schematic side elevation of the package and light of FIG. 1.

In FIGS. 1 and 2 of the accompanying drawings there is schematically depicted a packaging 10 containing a product 11. For example, a product 11 of this embodiment is a solar powered lighting device 110 such as the light assembly disclosed in Australian Patent Application 2004200419. The solar powered lighting device 110 is more fully described with reference to FIGS. 3 to 12 and is also described in the abovementioned Australian Patent Application including the circuit thereof. However the circuit includes a battery 14 contained in a battery compartment 13. The compartment 13 includes a positive terminal 17 and a negative terminal 18 that are to engage the corresponding terminals 15 and 16 of the battery 14. During normal use the negative terminals 15 and 17 are engaged and the positive terminals 16 and 18 are engaged. In this embodiment the terminal 18 is a spring that urges the terminal 17 into contact with the terminal 15.

Typically the battery 14 is charged when contained in the package 10, and the lighting device 110 includes a light sensitive switch (light sensitive resistor) that activates the lighting device 110 in the absence of light. Since the light sensitive switch is contained in the package 10 and therefore deprived of light its function is to activate the light. To prevent this, the circuit of the lighting device 110 is disabled by interruption of the circuit. In one particular example, the circuit is interrupted by placing insulation in the form of an insulator 19 between the terminals 15 and 17. The insulator 19 electrically isolates the terminals 15 and 17. The insulator 19 is a connector having conductive members (wires) 20 and 21 that extend to a switch 23. The switch 23 includes a button 24 that is urged to a disengaged position by means of a spring 25. When the button 24 is depressed it connects the members 20 and 21 so that electric power is delivered from the battery 14 to the remainder of the circuit of the lighting device 110 so that the lighting device 110 is activated. In view of the spring 25 the button 24 as mentioned is urged to the disengaged position. Accordingly by a user releasing the button 24 the switch 23 goes to the off position.

Preferably, the connector includes an elongated flexible strip having co-extensive longitudinally extending conductive strip portions separated by an insulating strip portion. The switch 23 when operated electrically connecting the conductive strip portions. The strip would be located between associated terminals 15 and 17, or 16 and 18. Preferably the connector is elongated so that the product 11 may be removed from the packaging 10 without the product 11 being disconnected from the switch 23.

Figure 12:
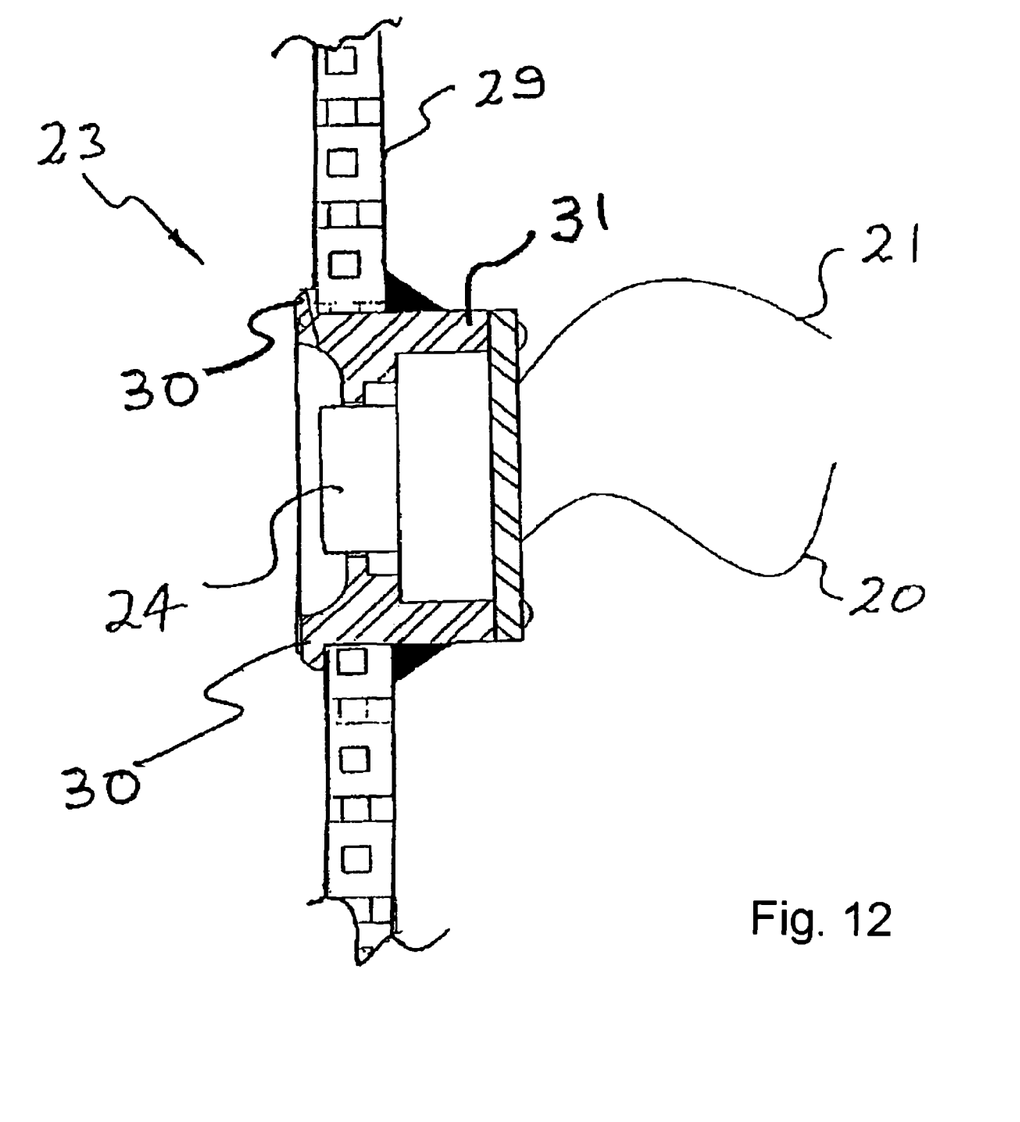
FIG. 12 is a schematic sectioned side elevation of a switch used in the package of FIGS. 1 and 2.

The abovementioned package 10 includes a box 26 having an aperture (window) 27 through which portion of the lens 28 may be viewed so that when the lighting device 110 is activated the light (including any coloured light) may be observed. The switch 23 is mounted on a wall 29 of the box 26. Although the switch 23 in FIG. 1 is illustrated protruding from the wall 27, preferably the button 30 is recessed (as shown in FIG. 12) so as not to protrude beyond the wall 29 so that when stacked the switch 23 cannot accidentally be activated.

The switch 23 includes a body 30 with an outwardly extending flange 31 that engages the wall 29 to inhibit displacement of the switch 23 inwardly of the wall 29 when the button 24 is depressed.

The insulator 19 would typically consist of a strip of plastics material within which the conductors 20 and 21 are embedded. A user of the product 12 when removing the product 12 from the box 26, removes the insulator 19 so that the terminals 15 and 17 become engaged. Typically the insulator 19 would pass through an aperture 30 in the battery compartment 13 and that by applying a force to the insulator 19 the insulator 19 slides from between the terminals 15 and 17. Under the influence of the terminal (spring) 18 the terminals 15 and 17 engage.

Accordingly the abovementioned circuit is disabled by the insulator 19 when engaged with the circuit, with removal of the insulator 19 from engagement of the circuit allowing normal operation of the circuit. However with the insulator 19 inserted operation of the circuit is possible by operation of the switch 23.

In FIGS. 3 to 12 of the accompanying drawings there is schematically depicted a lighting device 110. The device 110 of this embodiment is configured as a "garden light". The device 110 includes a body 111 including a post 112 from the lower end from which there extends a spike 113. The spike 113 is driven into a ground surface so that the post 112 is exposed above the ground surface.

Figure 3:
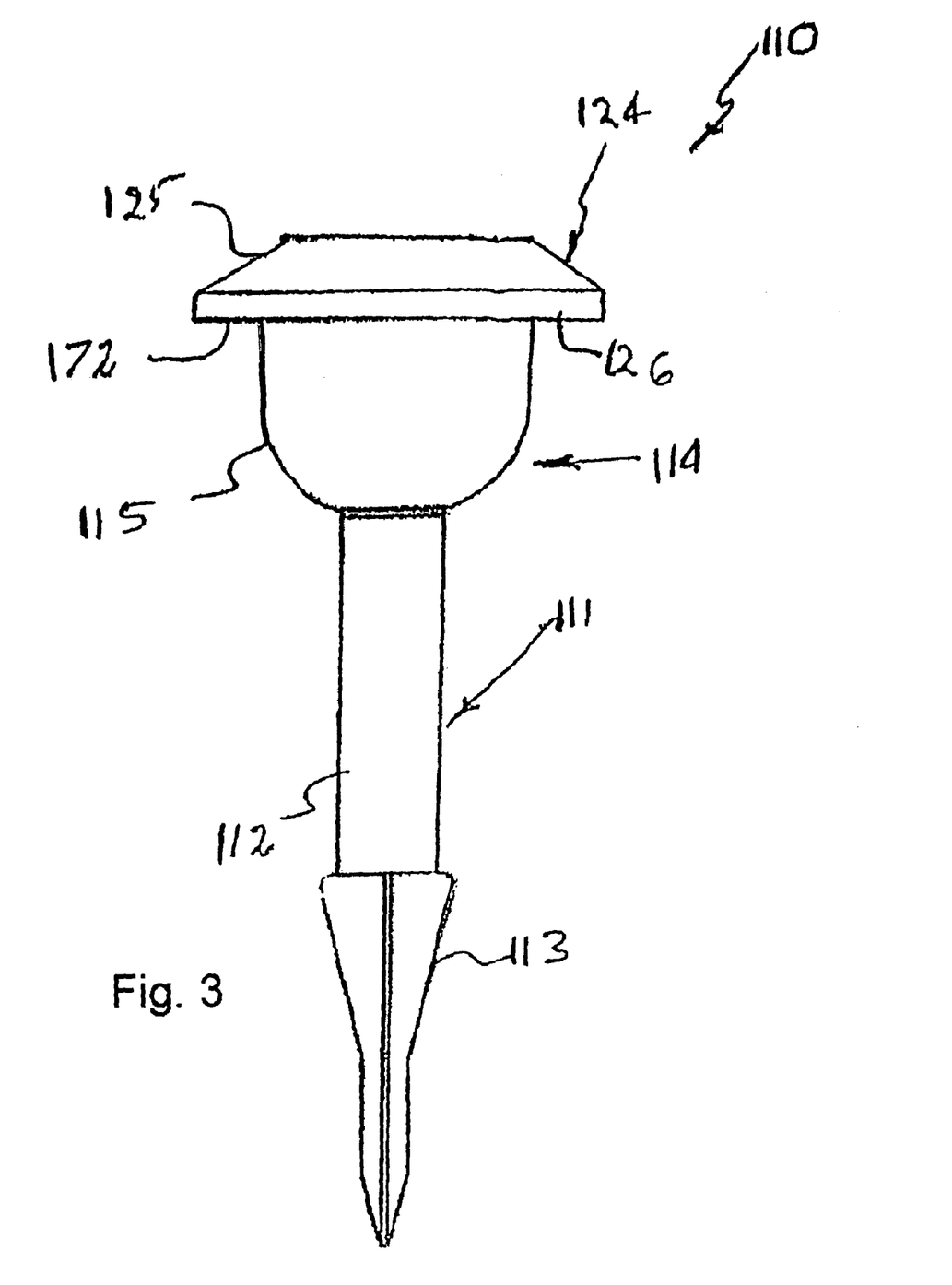
FIG. 3 is a schematic side elevation of a lighting device.
Figure 4:
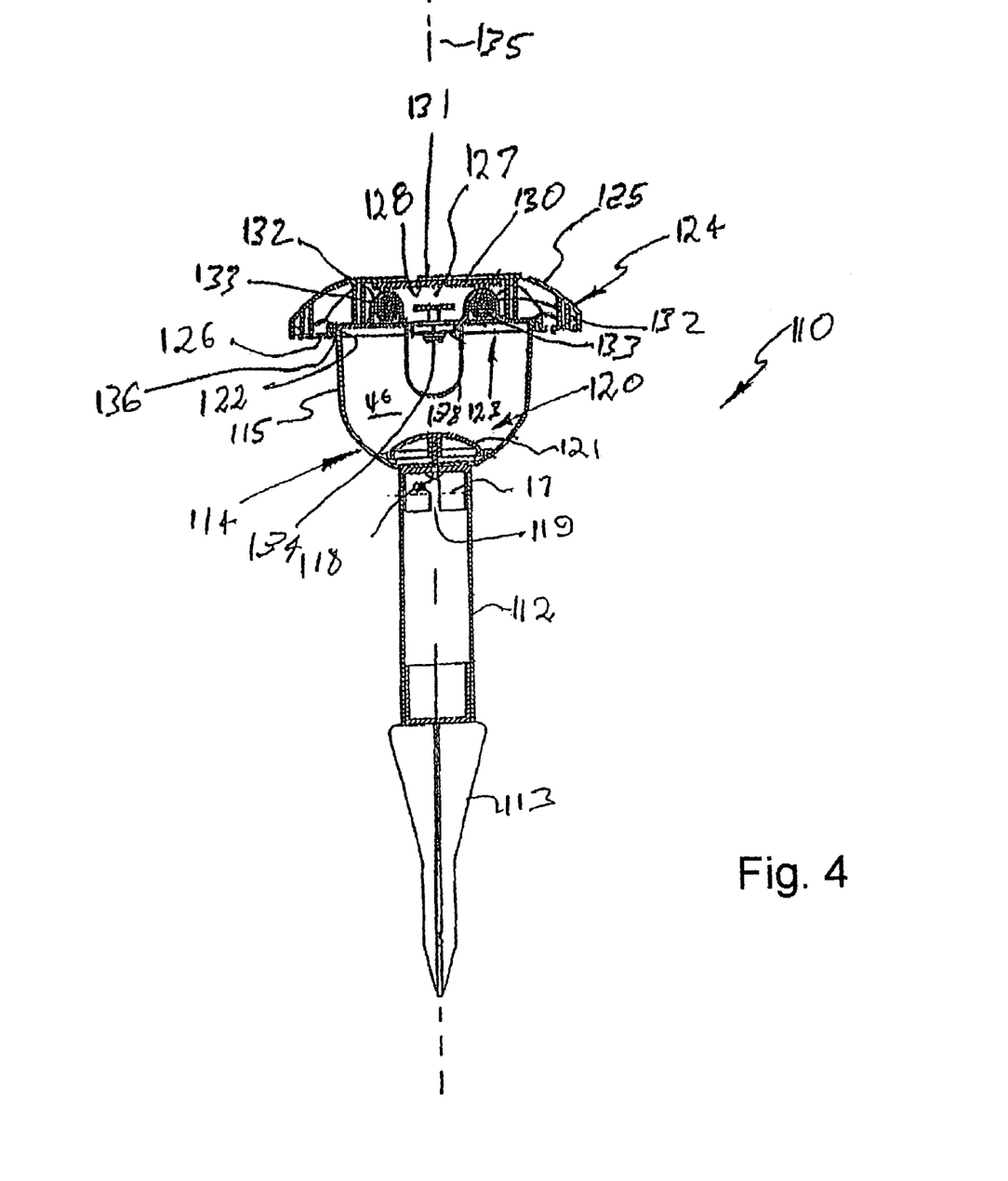
FIG. 4 is a schematic sectioned side elevation of the device of FIG. 3.
Figure 5:
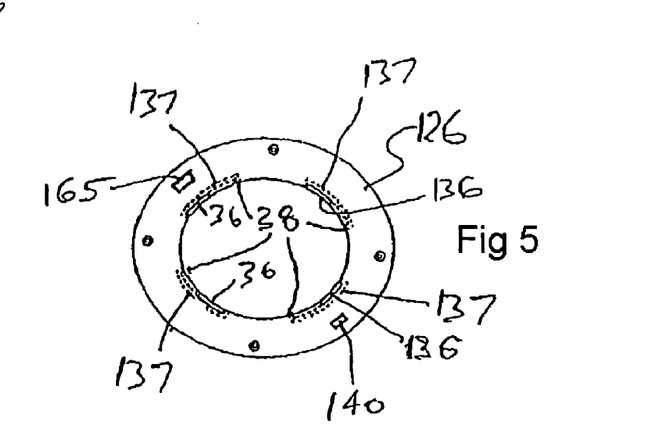
FIG. 5 is a schematic plan view of a moulding employed in the device of FIG. 3.

Attached to the upper end of the post 112 is a lens assembly 114. The lens assembly 114 includes a lens 115 that encompasses a chamber 116. The lower end of the lens 115 has fixed to it a "bayonet" fitting 117 that engages a shaft 118 fixed to the upper end of the post 112. The fitting 117 includes an "L" shaped slot 119 through which the shaft 118 passes to secure the lens assembly 114 to the upper end of the post 112. The post 112 may not be included in the packaging 10.

The chamber 116 includes a lower portion 120 within which there is mounted an arcuate reflector 121 that is concave.

Figure 8:
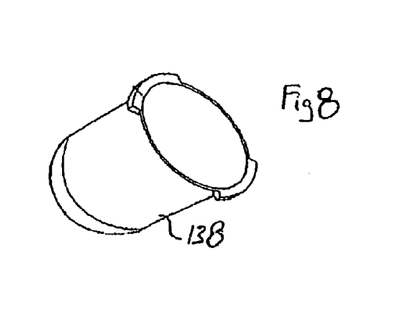
FIG. 8 is a schematic isometric view of a lens employed in the device of FIG. 3.

The lens 115 has a rim 122 surrounding the upper opening 123 of the lens 115.

Figure 7:
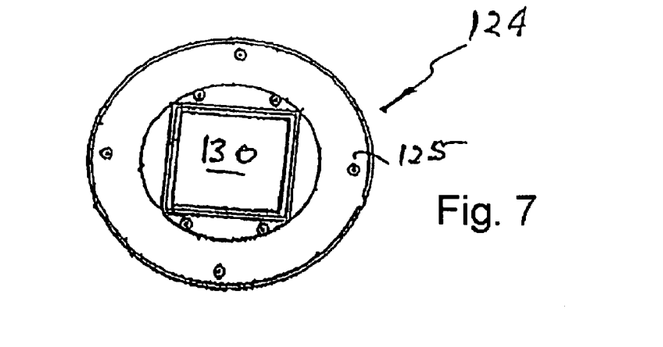
FIG. 7 is a schematic to plan view of a cap assembly employed in the device of FIG. 3.

Removably attached to the rim 122 is a cap assembly 124. The assembly 124 includes a cover 125 fixed to a base 126. The base 126 is located beneath the cover 125 and is shielded thereby. The base 126 and cover 125 encompass a chamber 127 within which there is a mounted moulding 128. The moulding 128 is provided with battery compartments 132. The components of the circuit 129 are located within the chamber 127, while the upper surface of the assembly 127 is provided with the solar cell 130. The cell 130 is exposed through a central rectangular aperture 131 of the cap 125.

Mounted within the chamber 127 via battery compartments 132 are rechargeable batteries 133 which are used to energise three LEDs 134. The LEDs 134 when illuminated produce red, green and blue light.

The cap assembly 124 is generally circular in configuration so as to provide the device 110 with a generally vertical longitudinal axis 135.

Figure 6:
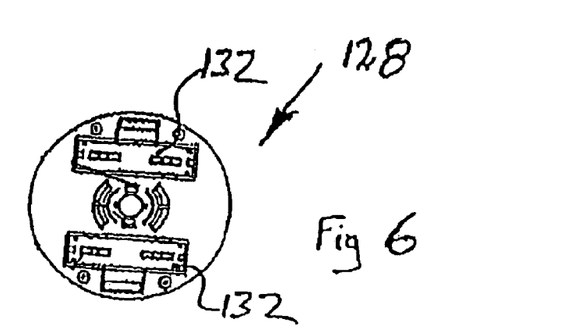
FIG. 6 is a schematic plan view of a base member of the device of FIG. 3.

The base 126 has radially inward projecting flange segments 136 that engage with radially outward extending flange segments 137 of the rim 122 to be secured thereto. By angular movement of the cap assembly 124 about the axis 135, the segments 136 and 137 engage or disengage to secure or to release the assembly 124 with respect to the lens 115. As can be noted from FIG. 5, the flange segments 127 have end abutment portions 138 against which these segments 136 engage when the assembly 124 is secured to the lens 115.

Figure 9:
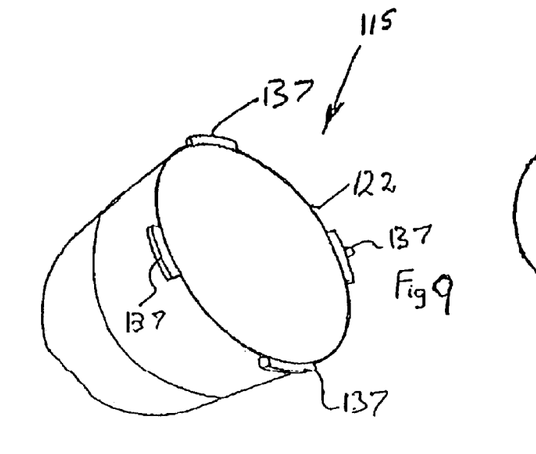
FIG. 9 is a schematic isometric view of a second lens employed in the device of FIG. 3.

Mounted on the under surface of the base 126 is a second lens 138. Accordingly, the LEDs 134 when activated have their light preferably diffused by the lens 138 and then further diffused by the lens 115. This in particular aids in producing a more evenly coloured light when the LEDs 134 are activated.

Figure 10:
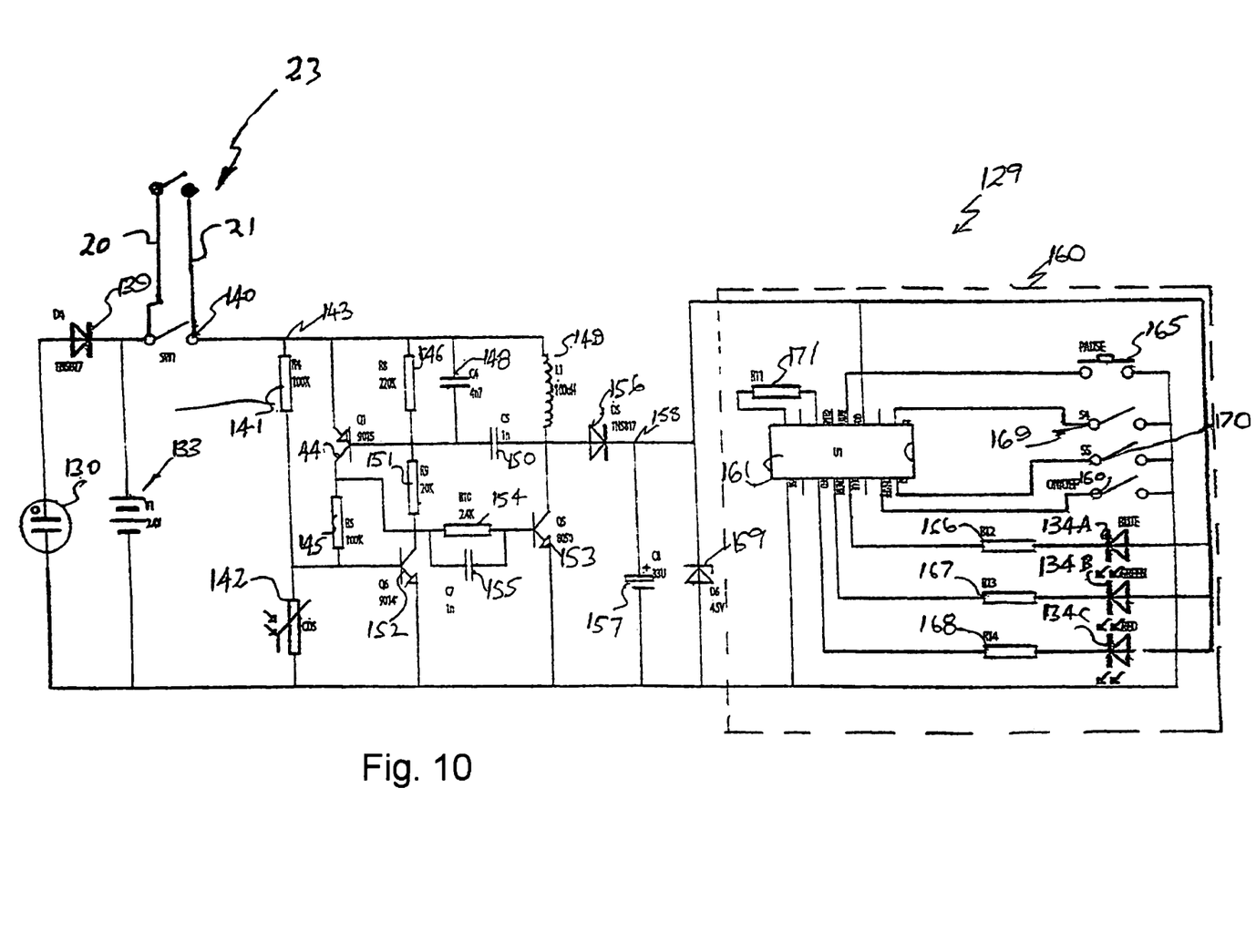
FIG. 10 is a circuit diagram of the circuit of the board of FIG. 6.

The circuit 129 powers and controls the lighting device 110 in accordance with an embodiment of this invention. The circuit 129 consists of a number of interconnected sub-circuits, including a power supply circuit, a light operated circuit, a boost-up circuit, a rectifier circuit, and a light circuit.

The power supply circuit comprises a solar cell 130 connected in series to a forward biased diode 139, which is in turn connected to a positive terminal of a battery 133. When in the package 10 the solar cell is preferably shielded from light. A negative terminal of the battery 133 is then connected to the solar cell 130 to complete the power supply circuit. In this example, the diode 139 is a model number IN5817 Schottky diode and the battery comprises two rechargeable 1.2 volt battery cells. It will be apparent to a person skilled in the art that other diode and battery configurations may be utilised without departing from the spirit and scope of the invention.

When the solar cell 130 is exposed to sufficient light, the solar cell converts some of the solar energy to electrical energy and creates a current that passes through the diode 139 to charge the battery 133. Thus, during the day the solar cell 130 converts energy from the sun to charge the battery 133. The diode 139 prevents the battery 133 from expending any power on the solar cell 130.

The power supply circuit is connected in parallel to the light operated circuit, which is connected across the terminals of the battery 133. The positive terminal of the battery 133 is connected to a switch 140, which is in turn connected to a 100kΩ first resistor 141. The first resistor 141 is connected in series with a second, light-dependent resistor 142. The second resistor 142 connects to the negative terminal of the batteries 133 to complete the light operated circuit. The value of resistance of the second resistor 142 depends on the amount of light to which the second resistor 142 is exposed.

When there is not much light, such as occurs during the night, the value of the second resistor 142 increases. During the daytime, when there is sufficient light, the value of the second resistor 142 decreases. Accordingly, the resistor 142 allows the lighting device to operate only when there is insufficient light, ie night. When in the package 10 the resistor 142 is shielded from the light and therefore allows operation of the lighting device.

The boost-up circuit is connected to the light operated circuit, in parallel with the first resistor 141 and the second, light-dependent resistor 142. A first circuit node 143 is defined between the switch 140 and the first resistor 141. Connected to the node 143, is an emitter terminal of a first triode 144. A collector terminal of the first triode 144 is connected in series with a 100kΩ third resistor 145. The third resistor 145 is then connected to a point between the first resistor 141 and the second resistor 142.

A 220kΩ fourth resistor 146 is connected to node 143 across the emitter and base terminals of the first triode 144. In parallel with the fourth resistor 146, and also connected across the emitter and base terminals of the first triode 144, is a 4.7 nF first capacitor 148. Further connected to node 143, across the emitter and base terminals of the first triode 144 and in parallel with each of the fourth resistor 146 and the first capacitor 148, is a 100 µH inductor 149 in series with a 1 nF second capacitor 150. The second capacitor is then connected to the base terminal of the first triode 144.

A 20kΩ fifth resistor 151 is connected across the base and collector terminals of the first triode 144. Connected across the terminals of the third resistor 145 are the collector and base terminals, respectively, of a second triode 152. The emitter terminal of the second triode 152 is connected to the negative terminal of the batteries 133.

Connected between the inductor 149 and the second capacitor 150 is the collector terminal of a third triode 153. The base terminal of the third triode 153 is connected via an intermediary circuit to the collector terminal of the second triode 152. The intermediary circuit consists of a 2.4kΩ fourth resistor 154 in parallel with a 1 nF third capacitor 155. The emitter terminal of the third triode 153 is connected to the negative terminal of the battery 133.

Also connected between the inductor 149 and the second capacitor 150 is the rectifier circuit. A forward biased diode 156 is connected to a point between the inductor 149 and the second capacitor 150, and then to a positive terminal of a 33 µF fourth capacitor 157. The negative terminal of the fourth capacitor 157 is connected to the negative terminal of the battery 133. A second circuit node 158 is defined between the second diode 156 and the fourth capacitor 157. Connected in parallel with the fourth capacitor 157, between the second node 158 and the negative terminal of the battery 133 is a reverse biased 4.5V third diode 159. The second diode 156, the fourth capacitor 157 and the third diode 159 comprise the rectifier circuit. Further connected to the second circuit node 158, in parallel with each of the capacitor 157 and the reverse diode 159, is a light circuit 160.

The light circuit 160 contains an integrated circuit (IC) 161 for controlling lighting effects provided by the lighting device 110. In the embodiment shown, the IC 161 is a 16-pin, three colour LED IC for controlling first, second and third light emitting diodes (LEDs) 134A, 134B and 134C. Each of pins 1, 15 and 16 is connected in series to respective switches 169, 170, 160. Each of the switches 169, 170 and 171 is then connected to the negative terminal of the battery 133. In one embodiment, the switches 169, 170, 171 correspond to the LEDs 134A, 134B, and 134C to enable or disable a particular colour range. In another embodiment, the switches 169, 170, 171 determine the frequency of a colour changing effect. In a further embodiment, the switches 169, 170, 171 determine the intensity of light emitted by each of the LEDs 134A, 134B, and 134C. Various combinations of the frequency and intensity of light are also possible. The switches 169, 170, 171 can be made accessible to a user to create custom lighting effects. Alternatively, the switches 169, 170, 171 are set according to a predetermined configuration and are not readily accessible by a user.

Pin 4 of the IC 161 enables an optional pause function. In this embodiment, pin 4 connects to a push button 165 that is, in tun, connected to the negative terminal of the batteries 133. Pin 3 of the IC 161 connects to the second circuit node 158.

Connected to the second circuit node 158, and in parallel with one another, are the first second and third forward biased light emitting diodes (LEDs) 134A, 134B and 134C. The first LED 134A is connected in series with a sixth resistor 166 that is connected to pin 13 of the IC 161. The second LED 134B is connected in series with a seventh resistor 167 that is connected to pin 12 of the IC 161. The third LED 134C is connected in series with an eighth resistor 168 that is connected to pin 11 of the IC 161. In this example, the first LED 134A is blue, the second LED 134B is green and the third LED 134C is red.

Pins 6 and 8 of the IC 161 are tied to one another via a ninth resistor 172, which in the embodiment shown is a 20KΩ resistor. The valve of the ninth resistor 171 determines the frequency of a colour change created by the IC 161. Accordingly, using different resistor valves for the ninth resistor 171 produces colour changes of different frequencies. Pin 9 of the IC 161 is tied to the negative terminal of the battery 133.

During the day, the solar cell 130 charges the battery 133. The value of the second resistor 142 is low and, consequently, small amounts of current flow through the boost-up circuit, rectifier circuit and light circuit. As night falls, the amount of energy converted by the solar cell 130 decreases. The resistance of the second resistor 142 increases and more current flows into the boost-up circuit, rectifier circuit and light circuit. This activates the LEDs 134A, 134B, and 134C in the light circuit and the light device 110 produces a changing light effect.

The integrated circuit 161 controls each of the first, second and third LEDs 134A, 134B, and 134C to produce a changing light effect for the light device 110. The integrated circuit varies the frequency and intensity of light emitted by the LEDs 134A, 134B, and 134C to produce a constantly changing kaleidoscopic effect. The light device 110 displays a constantly changing lighting effect that cycles through the light spectrum by ramping up and ramping down the intensity of light displayed by the LEDs 134A, 134B, and 134C.

Connecting the optional pause function of pin 4 of the IC 161 to the push button 165 enables a user to stop the changing light effect and maintain a constant colour. In this manner, a user can select a preferred colour for a lighting effect. The user observes the changing colour effect and when a desired colour is displayed, the user depresses the pause button 165.

The colour displayed at the time that the button is pressed then remains on. Preferably, the circuit retains sufficient charge such that a user selected colour is retained during the day and is displayed again when the light is reactivated the following evening. In this manner, the user does not have to reselect a desired colour each night. To reinstate the changing light effect, the user presses the push button 165 again and the changing light effect resumes.

In the embodiment shown in FIG. 9, the battery 133 powers the light circuit 160 during the night to produce light of varying colours and the user can optionally select a desired colour by pushing the push button 165. A selected colour is retained by memory in the IC 161. The memory may be a switch. Whilst the battery is powering the light circuit 160, the fourth capacitor 157 stores charge. As stated above, it is desirable for a selected colour to be retained and displayed on successive nights. As the battery 133 discharges, the output voltage of the battery 133 decreases. When the output voltage of the battery 133 is less than the stored voltage of the capacitor 157, the capacitor 157 discharges. Due to the presence and arrangement of the diodes 156 and 159, the capacitor 157 discharges through the light circuit 160.

The IC 161 preferably includes a cut-off circuit that is voltage dependent. As the capacitor 157 discharges, the voltage across the cut-off circuit decreases. Once the voltage across the cut-off circuit reaches a predetermined threshold value, the cut-off circuit prevents further power being consumed by the LEDs. As no power is being consumed by the light circuit 160, the capacitor 157 retains a residual charge. The residual charge maintains a voltage across the IC 160, which enables the selected colour to be retained by the memory in the IC 161.

During the next day, the solar cell 130 recharges the battery 133. As night falls, the resistance of resistor 142 again increases and the battery 133 provides sufficient power to the light circuit 160 to increase the voltage across the cut-off circuit above the predetermined threshold value. The LEDs are activated and the selected colour, as retained in the memory of the IC 161, is displayed. The voltage provided by the battery 133 is more than the stored charge of the fourth capacitor 157, so the capacitor 157 again begins to store charge.

It will be readily apparent to a person skilled in the art that there are many circuit variations possible for enabling and controlling the lighting display, without departing from the spirit and scope of the invention.

The switch 140 and/or switch 165 is/are mounted on the base 126 so as to be on a downwardly facing external surface 172 of the base 126. This enables a user to control the device via readily accessible switches, without needing to remove the cap assembly 124. The switches 140 and 165 are each operable to control delivery of electric power from the batteries to the LEDs 134A, 134B and 134C. The circuit 129 is only rendered operative when there is insufficient light, that is by operation of a light sensitive switch, ie the diode 142.

Figure 11:
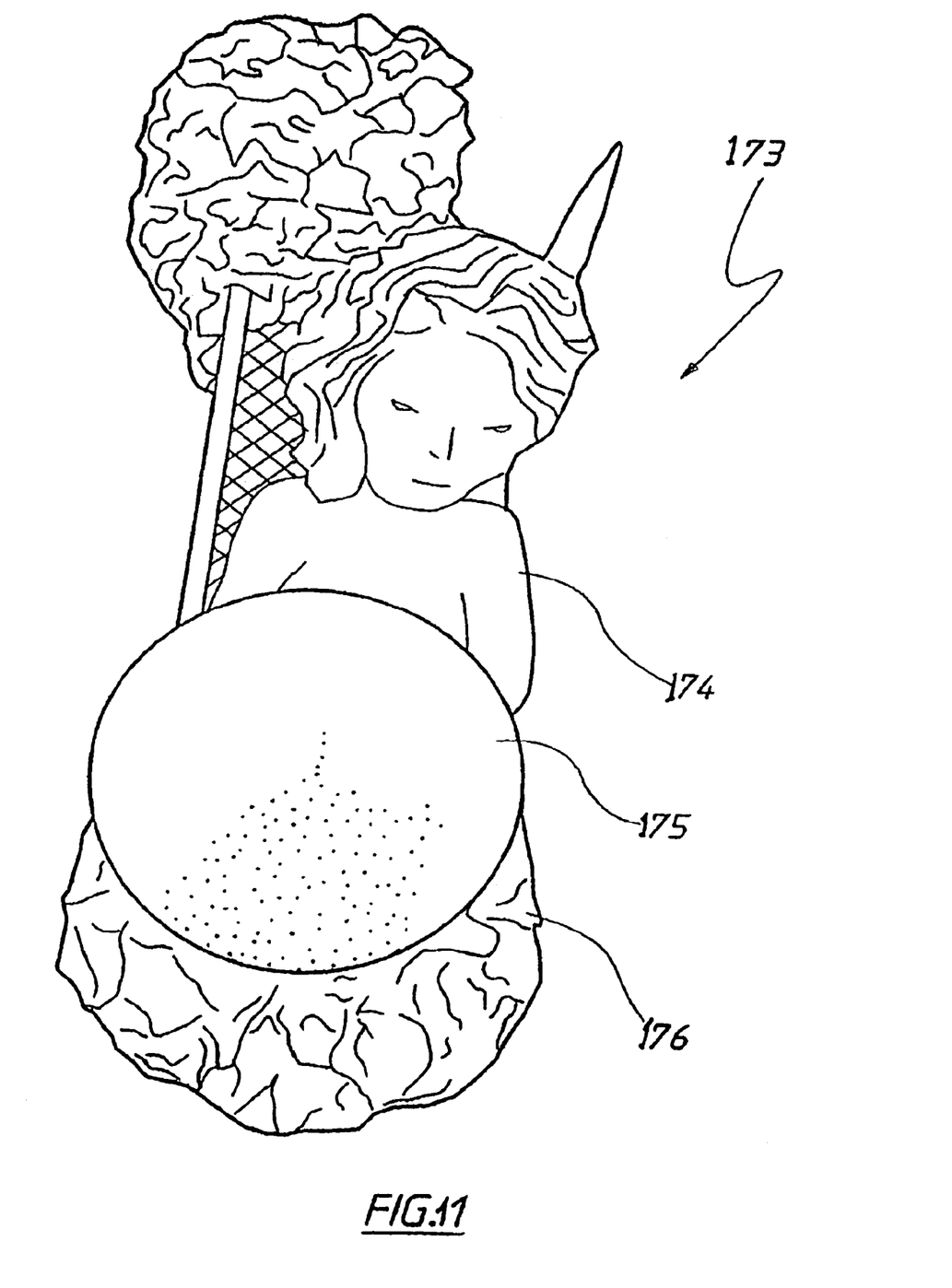
FIG. 11 is a schematic perspective view of an ornamental garden light.

The embodiment of FIG. 11 includes an ornamental garden light 173 having a body or base 174. The base 174 would be at least partly hollow so as to contain the circuitry of FIG. 9, except for the solar cell 130. The solar cell 130 would be mounted so as to be exposed to sunlight. The switches 140 and 165 would be mounted at an external surface of the base 174.

The switch 140 and/or switch 165 would be mounted on an external surface of the base 174, while the diode 142 would be exposed to sunlight.

The base 174 includes a spherical lens 175 secured to a horizontal portion 176 of the base 174. The horizontal portion 176 would have mounted in it the LEDs 134A, 134B and 134C so as to deliver light to the interior of the lens 175.

In the embodiments of FIGS. 3 to 10 and 12, the previously described switch 23 and associated wires 20 and 21 are arranged in parallel in respect of the switch 140. Accordingly like the previous embodiment, a user may operate the switch 23 while the lighting device 110 is still in the packaging 10, to thereby have the lighting device 110 produce a light varying colour.

The wires 20 and 21 are detachably connected to the device 110 so that upon removal of the device 110 from the packaging 10, the wires 20 and 21 detach from the device 110 so as to stay with the packaging 10.

In the above described preferred embodiments the solar cell, such as the solar cell 130, and the light sensitive switch, such as the light sensitive switch 142 are shielded from light, preferably they are shielded from light by being contained within the package 10, although the package 10 includes an aperture (window) 27. Accordingly, the light s sensitive switch enables operation of the lighting device. In some instances, the solar cell is used as the switch to enable operation of the circuit. For example, when the solar cell ceases to produce a current, the lighting device is then operable to produce a light. While the solar cell is producing a current greater than a predetermined current, the light circuit is disabled. Accordingly, in such constructions having the solar cell shielded from light enables operation of the device.

In the above described embodiments the switch 23 is in parallel to the switch 140, but renders the switch 140 ineffective until the strip (insulator 19) is removed.

The invention claimed is:

1. A light device comprising:
a lens being at least partially light transmissive;
at least one light emitting element which receives electrical power from at least one electrical power storage device disposed during use in said light device, said at least one light emitting element being arranged so as to generate light which passes outwardly of said light device through said lens;
a solar power converting device arranged to convert solar power to electrical power for recharging said at least one electrical power storage device disposed during use in said light device;
a control circuitry arranged to control supply of electrical power to said at least one light emitting element during use;
a light activation sub-control circuitry to activate said control circuitry at low light levels; and
a test device including:
an insulator;
a first conductor electrically connected to said electrical power storage device disposed during use in said light device;
a second conductor separated from said first conductor and electrically connected to said control circuitry; and
a test switch connected across said first and second conductors,
wherein at least one of said first and second conductors is disposed on a first side of said insulator; and
wherein said test device is disposed between said control circuitry and said at least one electrical power storage device, said test device being disposed in a first configuration wherein electrical power is able to pass through said test device between said electrical storage device and said control circuitry, and disposed in a second configuration wherein electrical power is not able to pass through said test device between said electrical storage device and said control circuitry.

2. The light device of claim 1, wherein said lens is selected from the group consisting of a light diffuser, at least one transparent panel, at least one translucent panel, a body portion being at least partially transparent or translucent, a diffuser body, an at least partially transparent casing, a transparent or translucent member, and a portion being arranged so as to at least partially pass light therethrough.

3. A solar powered light fixture and device package assembly comprising:
an at least one solar powered light fixture including:

an at least partially light transmissive lens;
at least one light emitting element arranged so as to generate light which passes outwardly of said lens;
at least one rechargeable power source which supplies electrical power to said at least one light emitting element;
a solar power converting device arranged to convert solar power to electrical power for recharging said at least one at least one rechargeable power source during normal use;
a control circuitry arranged to control supply of electrical power from said at least one rechargeable power source to said at least one light emitting element during use;
a light activation sub-control circuitry to activate said control circuitry at low light levels during normal use;
a solar light display device package comprising
a package housing including:
an at least partially non-light transmissive upper region which shields at least part of said lens from ambient light,
a back region proximate to said upper region,
at least one side region proximate to said upper region;
a lower region proximate to said at least one side region,
a front region proximate to said upper region and having at least one light transmissive aperture, and
wherein said upper, back, side, front and lower regions form a cavity; and
a user-operable and user-detachable test device disposed between said control circuitry and said at least one rechargeable power source,
wherein said test device is disposable in a first configuration which is manually activated by a user wherein electrical power is able to pass through said test device between said at least one rechargeable power source and said control circuitry such that said at least one light emitting element generates light which passes outwardly of said front region through lens and then said aperture;
wherein said test device is disposable in a second configuration wherein electrical power is not able to pass through said test device between said least one rechargeable power source and said control circuitry; and
wherein at least a portion of said at least one solar powered light fixture including said at least partially light transmissive lens, said at least one light emitting element and said at least one rechargeable power source are fully disposed within said cavity during display use; and
wherein said at least one solar powered light fixture is in a first instance associated with said packaging housing during said display use and in a second instance is removed from said package housing and detached from said test device during said normal use of said at least one solar powered light fixture.

4. The solar powered light fixture and device package assembly of claim 3, wherein said package housing shields at least part of said light activation sub-control circuitry from ambient light in order to activate said control circuitry when said test device is disposed in said first configuration.

5. The solar powered light fixture and device package assembly of claim 3, wherein said at least one solar powered light fixture further includes at least one battery compartment and wherein said rechargeable power source is at least one rechargeable battery disposed within said battery compartment, and wherein said test device further comprises:
a switch supported by said display package housing and positioned to enable a user to operate said switch without opening said package housing; and
an electric connector electrically attached to said switch; and
wherein said connector includes an insulator in respect of said at least one rechargeable battery and said control circuitry, and said insulator extends into said battery compartment, and is slidably removable there from to provide for connection of said battery electrically to said control circuitry.

6. The solar powered light fixture and device package assembly of claim 3, wherein said test device comprises:
a switch supported by said package housing and positioned to enable a user to operate said switch without opening said package housing during display use;
an electric connector electrically attached to said switch and removably attached to said control circuitry, and wherein said connector includes an insulator in respect of said at least one rechargeable power source and said control circuitry, and said insulator is slidably removable there from to provide for connection of said at least one rechargeable power source electrically to said control circuitry; and
wherein said switch is operated by a user during display use to cause said control circuitry to be energized and therefore said control circuitry to be operated, with said at least one rechargeable power source powering said control circuitry by operation of said switch, with operative detachment of said connector with respect to said control circuitry also providing for powering of said control circuitry by said at least one rechargeable power source during normal use, and thereof operation of said control circuitry.

7. The solar powered light fixture and device package assembly of claim 6, wherein said switch comprises a button that is pressed to activate said control circuitry, with said button being recessed relative to an outer surface of said front region.

8. The solar powered light fixture and device package assembly of claim 6, wherein said connector includes two conducting members attached to said switch, with said switch including a user engaged member that is moved to a position in said first configuration electrically connecting said two members in said first configuration, and is urged to a position not connecting said members in said second configuration.

9. The solar powered light fixture and device package assembly of claim 6, wherein said electric connector further comprises a first conductor electrically connected to said rechargeable power source, a second conductor separated from said first conductor and electrically connected to said control circuitry, and wherein said switch is connected across said first and second conductors, and wherein at least one of said first and second conductors is disposed on a first side of said insulator.

10. The solar powered light fixture and device package assembly of claim 9, wherein said second conductor is disposed on a second side of said insulator and separated from said first conductor by said insulator.

11. The solar powered light fixture and device package assembly of claim 6, wherein said test device connects in parallel to a portion of said control circuitry such that said test device operates independently of said portion of said control circuitry.

12. The solar powered light fixture and device package assembly of claim 6, wherein said connector includes a strip including longitudinally extending conductive strip portions between which there is located an insulating strip portion, with said conductive strip portions being connected to said switch so that operation of said switch electrically connects said two conductive portions with detachment of said strip with respect to said control circuitry providing for said operative detachment of said connector with respect to said control circuitry.

13. The solar powered light fixture and device package assembly of claim 12, wherein said at least one rechargeable power source is a battery having a positive terminal and a negative terminal, and said control circuitry further includes a positive terminal to be operatively associated with said positive terminal of said battery and a negative terminal to be operatively associated with said negative terminal of said battery, and said strip is arranged at a location between at least one of said two positive terminals and said two negative terminals so as to electrically isolate said battery from said control circuitry, said strip being removable from said location so that said battery can electrically energize said control circuitry.

14. The solar powered light fixture and device package assembly of claim 12, wherein said strip passes through at least one aperture in said battery compartment.

15. The solar powered light fixture and device package assembly of claim 6, wherein said connector is elongated to enable removal of said at least one solar powered light fixture from said packaging without disconnection from said switch.

16. The product and device package assembly of claim 6, wherein said connector disables said control circuitry when attached thereto until said switch is operated.

17. The solar powered light fixture and device package assembly of claim 3, wherein said at least one solar powered light fixture further comprises at least one user-operable device switch operable to at least partly control said control circuitry, thereby enabling a user to manipulate said at least one user-operated device switch during normal use to control delivery of electrical power to said at least at least one light emitting element; and
wherein said test device comprises a test switch electrically arranged in parallel in respect of said at least one user-operable device switch.

18. The solar powered light fixture and device package assembly of claim 3, wherein said at least one solar powered light fixture includes a second light fixture, wherein said second light fixture comprises:
an at least partially transparent or translucent portion disposed within said cavity during display use;
at least one second light emitting element arranged to receive power from a second rechargeable power storage device and wherein said at least one second light emitting element is arranged so as to generate light which passes outwardly through said portion.

19. A product and device package assembly comprising:
an electrically operated product including:
a control circuitry to electrically operate a part of said product, said control circuitry including said at least one battery to energize said circuit;
an enclosure containing said battery; and
a display device package including:
a package housing generally forming a cavity;
a switch supported by said package housing and positioned to enable a user to manually operate said switch without opening said package housing;
an electric connector electrically attached to said switch and removably attached to said control circuitry, and wherein said connector includes an insulator in respect of said at least one battery and said part, and wherein said insulator extends into said enclosure, and is slidably removable there from to provide for connection of said battery electrically to said part;
wherein said switch is operated by a user to cause said control circuitry to be energized and therefore said part to be operated, with said battery powering said control circuitry by operation of said switch, with operative detachment of said connector with respect to said control circuitry also providing for powering of said control circuitry by said battery, and thereof operation of said control circuitry; and
wherein said electrically operated product including said battery is fully disposed within said cavity.

20. The product and device package assembly of claim 19, wherein said connector includes a first conductor electrically connected to said battery, a second conductor separated from said first conductor and electrically connected to said control circuitry, wherein said switch is connected across said first and second conductors, and wherein at least one of said first and second conductors is disposed on a first side of said insulator.

21. The product and device package assembly of claim 20, wherein said second conductor is disposed on a second side of said insulator and separated from said first conductor by said insulator.

22. The product and device package assembly of claim 19, wherein said battery is a battery having a positive terminal and a negative terminal, and said control circuitry further includes a positive terminal to be operatively associated with said positive terminal of said battery and a negative terminal to be operatively associated with said negative terminal of said battery, and wherein said insulator is arranged at a location between at least one of said two positive terminals and said two negative terminals so as to electrically isolate said battery from said control circuitry, said insulator being removable from said location so that said battery can electrically energize said control circuitry.

23. The product and device package assembly of claim 19, wherein said package housing includes a wall, and said switch is recessed relative to said wall.

24. The product and device package assembly of claim 19, wherein said connector includes two conducting members electrically attached to said switch, with said switch including a user engaged member that is moved to a first position electrically connecting said two members and therefore causes operation of said control circuitry, and is urged to a second position not connecting said members.

25. The product and device package assembly of claim 19, wherein said connector includes a strip including longitudinally extending conductive strip portions between which there is located an insulating strip portion, with said conductive strip portions being electrically attached to said switch so that operation of said switch electrically connects said two conductive portions with detachment of said strip with respect to said control circuitry providing for said operative detachment of said connector with respect to said control circuitry.

26. The product and device package assembly of claim 19, wherein said connector is elongated to enable removal of said product from said package housing without disconnection from said switch.

27. The product and device package assembly of claim 19, wherein said connector disables said control circuitry when attached thereto until said switch is operated.

28. The product and device package assembly of claim 19, wherein said connector passes through an aperture in said enclosure.

29. The product and device package assembly of claim 19, wherein:

said switch is a packaging switch and wherein said electrically operated product further includes: a device switch operable to control delivery of electric power from said battery to operate said control circuitry, said device switch being a user-accessible switch, and wherein said device switch is electrically in parallel to said packaging switch.

30. The product and device package assembly of claim 19, wherein said battery is a rechargeable battery and said electrically operated product is a solar powered light including:
an at least partially light transmissive lens;
at least one light emitting element arranged so as to generate light which passes outwardly of said lens;
said at least one rechargeable battery which supplies electrical power to said at least one light emitting element;
a solar power converting device arranged to convert solar power to electrical power for recharging said at least one at least one rechargeable power source;
a control circuitry arranged to control supply of electrical power from said at least one rechargeable power source to said at least one light emitting element during use;
a light activation sub-control circuitry to activate said control circuitry at low light levels during normal use; and
wherein said package housing further includes:
an at least partially non-light transmissive upper region which shields at least part of said lens from ambient light,
a back region proximate to said upper region,
at least one side region proximate to said upper region;
a lower region proximate to said at least one side region,
a front region proximate to said upper region and having at least one light transmissive aperture, and wherein said upper, back, side, front and lower regions form a cavity; and
wherein said switch is disposable in a first configuration which is manually activated by a user via said front region wherein electrical power is able to pass through said test device between said least one rechargeable power source and said control circuitry such that said at least one light emitting element generates light which passes outwardly of said front region through lens and then said aperture;
wherein said switch is disposable in a second configuration wherein electrical power is not able to pass through said connector between said least one rechargeable battery and said control circuitry; and
wherein at least a portion of said fixture including said at least partially light transmissive lens, said at least one light emitting element and said at least one rechargeable battery are fully disposed within said cavity during display use; and
wherein said solar powered light fixture is in a first instance associated with said package housing during said display use and in a second instance is removed from said package housing and detached from said connector during said normal use of said solar powered light fixture.

31. The product and device package assembly of claim 30, wherein said package housing shields at least part of said light activation sub-control circuitry from ambient light in order to activate said control circuitry when said switch is disposed in said first configuration.

32. The product and device package assembly of claim 30, wherein said switch includes a button that is pressed to activate said control circuitry, with said button being recessed relative to said wall.

33. The product and device package assembly of claim 30, wherein said connector includes two conducting members attached to said switch, with said switch including a user engaged member that is moved to a position electrically connecting said two members and therefore causes operation of said control circuitry, and is urged to a position not connecting said members.

34. The product and device package assembly of claim 30, wherein said connector includes a strip including longitudinally extending conductive strip portions between which there is located an insulating strip portion, with said conductive strip portions being attached to said switch so that operation of said switch electrically connects said two conductive portions with detachment of said strip with respect to said control circuitry providing for said operation detachment of said connector with respect to said control circuitry.

35. The product and device package assembly of claim 34, wherein said connector is elongated to enable removal of said product from said package housing without disconnection from said switch.

36. The product and device package assembly of claim 30, wherein said at least one battery is a battery having a positive terminal and a negative terminal, and said control circuitry further includes a positive terminal to be operatively associated with said positive terminal of said battery and a negative terminal to be operatively associated with said negative terminal of said battery, and said connector is an insulator in respect of said battery by being located between said two positive terminals and/or said two negative terminals so as to electrically isolate said battery, said insulator being removable from between said terminals so that said battery can electrically energize said control circuitry.

37. The product and device package assembly of claim 19, wherein said connector disables said control circuitry when attached thereto until said switch is operated.

38. The product and device package assembly of claim 30, wherein said connector disables said control circuitry when attached thereto until said switch is operated.

39. A product and device package assembly comprising:
an electrically operated product including:
a control circuit to electrically operate said product;
a battery electrically connected to said control circuit;
an enclosure for housing said control circuit and battery; and
said enclosure having at least one slot to receive at least one insulated pull-tab that when received in said at least one slot, said at least one insulated pull-tab disrupts the electrical connection between said battery and said control circuit; and
a device package including:
a package housing having an outer surface forming a cavity;
a switch accessible from said outer surface of said package housing; and
an electric connector having at least one package pull-tab having an insulated portion and an electrically conductive portion electrically connected to said switch;
wherein, when said at least one package pull-tab is received in said at least one slot, the electrical connection between said battery and control circuit is routed through said switch.

40. A product and device package assembly comprising:
an at least partially transparent or translucent lens portion;
at least one light-emitting element which receives electrical power from at least one electrical power storage device disposed during use in said light device, said at least one light emitting element being arranged so as to generate light which passes outwardly of said light device through said lens portion;

a solar power converting device arranged to convert solar power to electrical power for recharging said at least one electrical power storage device disposed during use in said light device;

a test device disposed between said at least one light emitting element and said at least one electrical power storage device disposed during use in said light device, said test device being disposable in a first configuration wherein electrical power is able to pass through said test device between said at least one electrical storage device disposed during use in said light device and said at least one light emitting element, and a second configuration wherein electrical power is not able to pass through said test device between said at least one electrical storage device disposed during use in said light device and said at least one light emitting element, and wherein said test device comprises: a connector having at least two conductors electrically connecting said electrical power storage device and said at least one light emitting element; and a test switch connected across said conductors;

a device package comprising a light-transmissive portion and wherein said device package houses at least:

said lens portion, said at least one electrical storage device, said test device; and wherein said test switch is accessible by a user external from said device package and wherein at least part of said lens portion is illuminated by said at least one light emitting element and viewable by a user through said light-transmissive portion when said switch is activated by said user.

41. The product and device package assembly of claim 40 further comprising a user-operable device switch proximate to said at least one electrical power storage device wherein said wherein said device switch is operable to enable or disable a particular color range emitted by said at least one light-emitting element including a fixed color of emitted light.

42. The product and device package assembly of claim 41 wherein said user-operable device switch has at least a first position and a second position and wherein said first position disables electrical power to said at least one light-emitting element.

43. The product and device package assembly of claim 40 wherein said user-operable device switch is operable to selected a fixed color of emitted light.

44. A rechargeable light fixture and device package assembly comprising:

at least a first rechargeable light fixture including:

an at least partially light transmissive lens;

at least one light emitting element arranged so as to generate light which passes outwardly of said lens;

at least one rechargeable power source which supplies electrical power to said at least one light emitting element;

a control circuitry arranged to control supply of electrical power from said at least one rechargeable power source to said at least one light emitting element during use;

a light display device package comprising:

a package housing including:

an at least partially non-light transmissive upper region which shields at least part of said lens from ambient light, a back region proximate to said upper region, at least one side region proximate to said upper region;

a lower region proximate to said at least one side region, a front region proximate to said upper region and having at least one light transmissive aperture, and wherein said upper, back, side, front and lower regions form a cavity; and a user-operable and user-detachable test device disposed between said control circuitry and said at least one rechargeable power source, wherein said test device is disposable in a first configuration which is manually activated by a user wherein electrical power is able to pass through said test device between said at least one rechargeable power source and said control circuitry such that said at least one light emitting element generates light which passes outwardly of said front region through lens and then said aperture;

wherein said test device is disposable in a second configuration wherein electrical power is not able to pass through said test device between said least one rechargeable power source and said control circuitry ; and wherein at least a portion of said at least a first rechargeable light fixture including said at least partially light transmissive lens, said at least one light emitting element and said at least one rechargeable power source are fully disposed within said cavity during display use; and wherein said at least a first rechargeable light fixture is in a first instance associated with said packaging housing during said display use and in a second instance is removed from said package housing and detached from said test device during said normal use of said at least a first rechargeable light fixture.

45. The rechargeable light fixture and device package assembly of claim 44, wherein said at least a first rechargeable light fixture further includes at least one battery compartment and wherein said rechargeable power source is at least one rechargeable battery disposed within said battery compartment, and wherein said test device further comprises:

a switch supported by said display package housing and positioned to enable a user to operate said switch without opening said package housing; and an electric connector electrically attached to said switch; and wherein said connector includes an insulator in respect of said at least one rechargeable battery and said control circuitry, and said insulator extends into said battery compartment, and is slidably removable therefrom to provide for connection of said battery electrically to said control circuitry.

\* \* \* \* \*